United States Patent
Popa et al.

(10) Patent No.: US 9,113,226 B2
(45) Date of Patent: Aug. 18, 2015

(54) METHODS AND SYSTEMS FOR RE-SECURING A COMPROMISED CHANNEL IN A SATELLITE SIGNAL DISTRIBUTION ENVIRONMENT

(75) Inventors: Ovidiu Octavian Popa, Richmond Hill (CA); Alexander Ishankov, Toronto (CA); Alan Dagenais, Stouffville (CA); Louie Andriano, Maple (CA); Bratislav Becic, North York (CA); Tim Dinesen, Scugog (CA)

(73) Assignee: BCE INC., Verdun, Quebec (CA)

( * ) Notice: Subject to any disclaimer, the term of this patent is extended or adjusted under 35 U.S.C. 154(b) by 7 days.

(21) Appl. No.: 13/517,498

(22) PCT Filed: Jul. 20, 2010

(86) PCT No.: PCT/CA2010/001130
§ 371 (c)(1),
(2), (4) Date: Jun. 20, 2012

(87) PCT Pub. No.: WO2011/075811
PCT Pub. Date: Jun. 30, 2011

(65) Prior Publication Data
US 2012/0257748 A1    Oct. 11, 2012

Related U.S. Application Data

(60) Provisional application No. 61/288,631, filed on Dec. 21, 2009.

(51) Int. Cl.
*H04N 7/167* (2011.01)
*H04N 21/647* (2011.01)
(Continued)

(52) U.S. Cl.
CPC ........ *H04N 21/64715* (2013.01); *H04L 9/0891* (2013.01); *H04N 21/26606* (2013.01);
(Continued)

(58) Field of Classification Search
CPC ................ H04N 21/26606; H04N 21/26613; H04N 21/6143; H04N 21/64715; H04N 21/64723; H04N 21/6193; H04N 21/4623; H04N 21/4405; H04N 21/4345; H04N 21/2541; H04L 9/0891; H04L 2209/60; H04L 63/0428; H04L 2209/601; H04L 65/4076; H04L 9/0822; G06F 21/10
USPC .................... 380/200, 255, 259, 277; 725/25
See application file for complete search history.

(56) References Cited

U.S. PATENT DOCUMENTS

| | | |
|---|---|---|
| 5,903,878 A | 5/1999 | Talati et al. |
| 6,507,907 B1 * | 1/2003 | Takahashi et al. ............ 713/150 |

(Continued)

FOREIGN PATENT DOCUMENTS

| | | |
|---|---|---|
| EP | 1765012 | 3/2007 |
| WO | 2007001287 | 1/2007 |
| WO | 2007027626 | 3/2007 |

OTHER PUBLICATIONS

Non-Final Office Action issued by the United States Patent and Trademark Office on Sep. 5, 2012 in connection with U.S. Appl. No. 12/643,400, 10 pages.

(Continued)

*Primary Examiner* — Michael Chao
*Assistant Examiner* — Shu Chun Gao

(57) ABSTRACT

A method implemented by a set top box that encrypts communications for a channel stacking switch (CS) using a public key of the CSS, the method comprising: obtaining a message from a head end; extracting electronic counter measure (ECM) data from the message; sending the ECM data to the CSS; receiving, in response to the sending, a new public key of the CSS; encrypting communications for the CSS using the new public key of the CSS. Also, a method for implementation by a CSS, comprising: maintaining a private key and a public key; obtaining ECM data sent by a set top box in communication with the CSS; obtaining an identifier of the CSS; formulating a new public key based on the private key, the identifier and the ECM; rendering the new public key available to the set top box.

9 Claims, 7 Drawing Sheets

(51) Int. Cl.
*H04N 21/266* (2011.01)
*H04N 21/61* (2011.01)
*H04L 9/08* (2006.01)

(52) U.S. Cl.
CPC ..... *H04N21/26613* (2013.01); *H04N 21/6143* (2013.01); *H04N 21/6193* (2013.01); *H04N 21/64723* (2013.01); *H04L 2209/60* (2013.01)

(56) References Cited

U.S. PATENT DOCUMENTS

| | | | |
|---|---|---|---|
| 6,904,522 | B1 | 6/2005 | Benardeau et al. |
| 7,039,802 | B1 | 5/2006 | Eskicioglu et al. |
| 7,130,576 | B1 | 10/2006 | Gurantz et al. |
| 7,542,715 | B1 | 6/2009 | Gurantz et al. |
| 7,712,120 | B2 | 5/2010 | Nadarajah et al. |
| 7,930,712 | B1 | 4/2011 | Joseph et al. |
| 7,941,091 | B1 | 5/2011 | Doherty et al. |
| 8,321,278 | B2 | 11/2012 | Haveliwala et al. |
| 2003/0061477 | A1 | 3/2003 | Kahn et al. |
| 2003/0081774 | A1 | 5/2003 | Lin et al. |
| 2004/0091114 | A1 | 5/2004 | Carter et al. |
| 2004/0148632 | A1 | 7/2004 | Park et al. |
| 2005/0050333 | A1 | 3/2005 | Yeap et al. |
| 2006/0018345 | A1 | 1/2006 | Nadarajah et al. |
| 2006/0098819 | A1* | 5/2006 | Zeng et al. ........ 380/44 |
| 2006/0141963 | A1 | 6/2006 | Maxim et al. |
| 2006/0225098 | A1 | 10/2006 | James et al. |
| 2007/0133780 | A1 | 6/2007 | Berner et al. |
| 2007/0250909 | A1 | 10/2007 | James et al. |
| 2007/0266241 | A1 | 11/2007 | Wu et al. |
| 2008/0059646 | A1 | 3/2008 | Ludvig et al. |
| 2008/0307465 | A1 | 12/2008 | Wu |
| 2008/0307474 | A1 | 12/2008 | Muth et al. |
| 2009/0232077 | A1 | 9/2009 | Krieger et al. |
| 2009/0290711 | A1* | 11/2009 | Bloom et al. ........ 380/239 |
| 2010/0169938 | A1 | 7/2010 | Nadarajah et al. |
| 2011/0013774 | A1 | 1/2011 | Popa et al. |
| 2011/0016496 | A1 | 1/2011 | Popa et al. |

OTHER PUBLICATIONS

Entropic Communications, "RF5219 Satellite Channel Stacking Switch (SCSSS)", May 2008, 2 pages.
Satellite Signals, "Satellite LNB: What is it, how does it work and where do I buy one?, Low noise block downconverter (LNB)", http://www.satsig.net/lnb/explanation-description-lnb.htm, Jul. 15, 2009, 4 pages.
European Telecommunications Satellite Organization (EUTELSAT), "Digital Satellite Equipment Control (DiSEqC™ ), Bus Functional Specification Version 4.2", Organisation européenne de télécommunications par satellite, Feb. 25, 1998, 28 pages.
Wikipedia, The Free Encyclopedia, "Low-noise block converter", http://en.wikipedia.org/wiki/Low-noise_block_converter, Jul. 15, 2009, 5 pages.
Mike Ploof et al., "Channel stacking switch technology for residential DBS reduces cabling and STBs", Nov. 16, 2007, EE Times-India, www.eetindia.com, 5 pages.
International Search Report mailed on Oct. 12, 2010 in connection with International Patent Application Serial No. PCT/CA2010/001131, 3 pages.
Written Opinion of the International Searching Authority mailed on Oct. 12, 2010 in connection with International Patent Application Serial No. PCT/CA2010/001131, 5 pages.
International Search Report mailed on Nov. 4, 2010 in connection with International Patent Application Serial No. PCT/CA2010/001132, 5 pages.
Written Opinion of the International Searching Authority mailed on Nov. 4, 2010 in connection with International Patent Application Serial No. PCT/CA2010/001132, 8 pages.
International Search Report mailed on Oct. 29, 2010 in connection with International Patent Application Serial No. PCT/CA2010/001130, 3 pages.
Written Opinion of the International Searching Authority mailed on Oct. 29, 2010 in connection with International Patent Application Serial No. PCT/CA2010/001130, 6 pages.
Non-Final Office Action issued on Jan. 19, 2012 in connection with U.S. Appl. No. 12/643,691, 28 pages.
Final Office Action issued on May 4, 2012 in connection with U.S. Appl. No. 12/643,691, 23 pages.
Entropic Communications, "DBS Outdoor Unit Solutions", http://www.entropic.com/technology/dbssolutions.htm, downloaded on May 13, 2011, 1 page.
Final Office Action issued by the United States Patent and Trademark Office on Jul. 3, 2013 in connection with U.S. Appl. No. 12/292,745, 11 pages.
Final Office Action issued by the United States Patent and Trademark Office on Jul. 18, 2013 in connection with U.S. Appl. No. 12/314,735, 22 pages.
Images captured by www.archive.org ("the wayback machine"); snapshots of that http://www.ip2location.com; dated prior to May 30, 2007; referred to as ip2location, labeled pages C-F attached.
Non-Final Office Action issued by the United States Patent and Trademark Office on May 23, 2013 in connection with U.S. Appl. No. 12/643,400, 11 pages.
Non-Final Office Action issued by the United States Patent and Trademark Office on Nov. 18, 2013 in connection with U.S. Appl. No. 12/643,400, 15 pages.
Extended European Search Report mailed on Jun. 12, 2014 in connection with International Patent Application PCT/CA2010/001132, 143 pages.

* cited by examiner

METHODS AND SYSTEMS FOR RE-SECURING A COMPROMISED CHANNEL IN A SATELLITE SIGNAL DISTRIBUTION ENVIRONMENT

CROSS-REFERENCE TO RELATED APPLICATION

This application claims the benefit under 35 USC §119 (e) of U.S. Provisional Patent Application Ser. No. 61/288,631 filed on Dec. 21, 2009, hereby incorporated by reference herein.

FIELD OF THE INVENTION

The present invention relates generally to an environment for distributing satellite signals to set top boxes and, more particularly, to methods and systems for achieving improved signal security in such an environment.

BACKGROUND

Improving the security of a satellite signal is a continuous challenge for signal distributors. The lack of a native two-way communication channel between receiver and head end leaves the satellite signal vulnerable to piracy. In one type of attack, a subscribing customer activates multiple receivers under one account and passes them along to friends and neighbors for a nominal fee that is less than what would be charged by the satellite distributor if each friend or neighbor were to establish their own individual account. Another form of piracy arises when a subscribing customer retrieves a security code from a legitimate receiver, and distributes the code to non-subscribing owners of other receivers through another communication medium (usually the Internet).

Clearly, such breaches of security can have an impact on revenues and therefore improvements in the area of protecting satellite signals from piracy would be welcomed by the satellite signal distribution industry.

SUMMARY

According to a first broad aspect, the present invention seeks to provide a method implemented by a set top box that encrypts communications for a channel stacking switch using a public key of the channel stacking switch, the method comprising: obtaining a message from a head end; extracting ECM data from the message; sending the ECM data to the channel stacking switch; receiving, in response to the sending, a new public key of the channel stacking switch; encrypting communications for the channel stacking switch using the new public key of the channel stacking switch.

According to a second broad aspect, the present invention seeks to provide a set top box comprising: a communications interface configured to communicate with a channel stacking switch over a communication channel; a processing entity configured to encrypt data destined for the channel stacking switch using a public key of the channel stacking switch, obtain a message from a head end via the communications interface, extract ECM data from the message, send the ECM data to the channel stacking switch via the communication interface, receive a new public key of the channel stacking switch via the communications interface and begin encrypting subsequent data destined for the channel stacking switch using the new public key of the channel stacking switch.

According to a third broad aspect, the present invention seeks to provide a computer-readable storage medium storing instructions for execution by a computing entity of a set top box (STB) capable of encrypting communications for a channel stacking switch using a public key of the channel stacking switch, wherein execution of the instructions by the computing entity causes the STB to: obtain a message from a head end; extract ECM data from the message; send the ECM data to the channel stacking switch; receive, in response to the sending, a new public key of the channel stacking switch; encrypt communications for the channel stacking switch using the new public key of the channel stacking switch.

According to a fourth broad aspect, the present invention seeks to provide a method for implementation by a channel stacking switch, comprising: maintaining a private key and a public key; obtaining ECM data sent by a set top box in communication with the channel stacking switch; obtaining an identifier of the channel stacking switch; formulating a new public key based on the private key, the identifier and the ECM; rendering the new public key available to the set top box.

According to a fifth broad aspect, the present invention seeks to provide a channel stacking switch, comprising: a memory configured to maintain a private key and a public key; a communications interface configured to communicate with a set top box over a communication channel and also configured to receive data sent from a head end over a satellite link; a processing entity configured to obtain via the communication interface ECM data sent by the set top box, obtain an identifier of the channel stacking switch; formulate a new public key based on the private key, the identifier and the ECM and send the new public key to the set top box.

According to a sixth broad aspect, the present invention seeks to provide a computer-readable storage medium storing instructions for execution by a computing entity of a channel stacking switch (CSS), wherein execution of the instructions by the computing entity causes the CSS to: maintain a private key and a public key; obtain ECM data sent by a set top box in communication with the channel stacking switch; obtain an identifier of the channel stacking switch; formulate a new public key based on the private key, the identifier and the ECM; render the new public key available to the set top box.

According to a seventh broad aspect, the present invention seeks to provide a method for re-securing communications in a satellite signal distribution network, comprising: detecting an actual or suspected breach of security of a channel used by a particular channel stacking switch to communicate with one or more set top boxes; obtaining ECM data for the particular channel stacking switch; sending the ECM data to the particular channel stacking switch; commanding a key exchange between the channel stacking switch and at least one of the one or more set top boxes.

According to an eighth broad aspect, the present invention seeks to provide a computer-readable storage medium storing instructions for execution by a computing entity of a head end in a satellite signal distribution environment, wherein execution of the instructions by the computing entity causes the head end to: receive an indication of an actual or suspected breach of security of a channel used by a particular channel stacking switch to communicate with one or more set top boxes; obtain ECM data for the particular channel stacking switch; send the ECM data to the particular channel stacking switch; command a key exchange between the channel stacking switch and at least one of the one or more set top boxes.

These and other aspects and features of the present invention will now become apparent to those of ordinary skill in the art upon review of the following description of specific embodiments of the invention in conjunction with the accompanying drawings.

It is to be expressly understood that the description and drawings are only for the purpose of illustration of certain embodiments of the invention and are an aid for understanding. They are not intended to be a definition of the limits of the invention.

DESCRIPTION

Embodiments of the present invention propose a solution for securing part of the communication channel between the head end and the user receiver (set top box—STB). This solution is based on the intelligence provided by the STB and an outdoor unit (ODU), in particular a Channel Stacking Switch (CSS). CSS technology reduces STB installation costs and complexity, by requiring only one cable drop per STB, even if the receiver (i.e., the STB) has multiple tuners. The interested reader can find more information about channel stacking switches and their applications in the document entitled "Channel Stacking Switch Technology for Residential DBS Reduces Cabling and STBs", by M. Ploof, P. Wong and T. Brandon, EE Times-India (www.eetindia.com), November 2007. This document is hereby incorporated herein by reference.

Generally speaking, the CSS provides a plurality of User Bands (UBs) between itself and one or more set top boxes. A single-tuner STB is assigned one of the user bands and a dual-tuner STB is assigned two of the user bands. The use of a CSS to distribute satellite signals to a group of set top boxes thus becomes an economical choice when upgrades are envisaged, such as in a single family home when multiple viewing areas are required, and in multi-dwelling units (MDUs).

The term "set top box" is not intended to be limited to a particular hardware configuration, but rather is meant to encompass receivers that are capable of processing a signal received from an external source for delivery to a display set for conveyance to a user. The term "processing" is meant to encompass one or more of filtering, decoding, descrambling, demultiplexing and downconverting the received signal. The display set can include a television set, a computer monitor and/or a mobile device, to name a few non-limiting possibilities.

Figure 1:
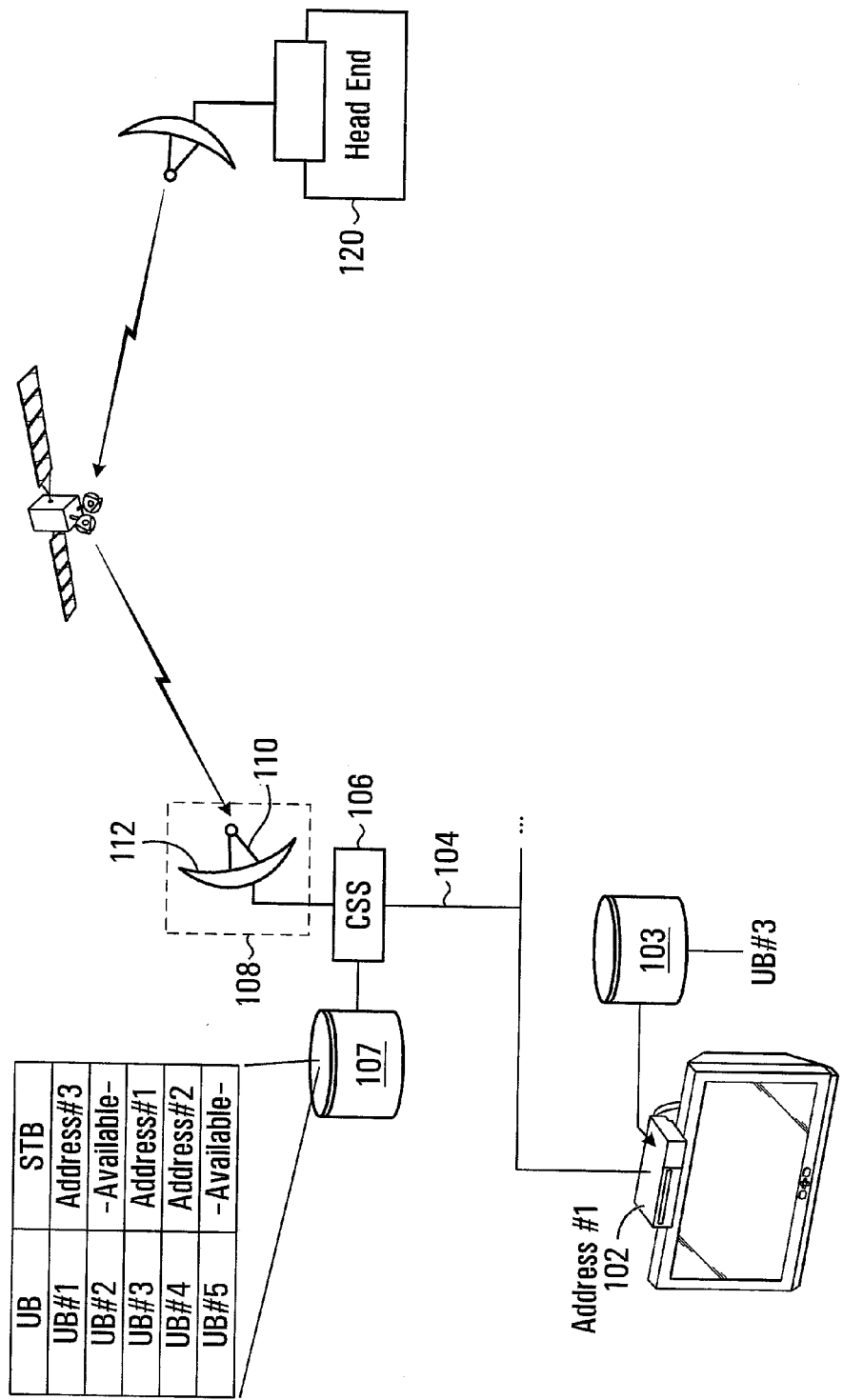
FIG. 1 is a block diagram of a satellite signal distribution environment involving a channel stacking switch and a set top box.

Reference is made to FIG. 1, which shows a satellite signal distribution environment. In the illustrated environment, a set top box (STB) 102 communicates over a communications link 104 (e.g., a cable) with an outdoor unit, in this case illustrated as a Channel Stacking Switch (CSS) 106. To this end, the CSS 106 and the STB 102 each have a respective communications interface and a respective processing entity (e.g., a controller running software or firmware). Although FIG. 1 illustrates a single set top box (STB 102), it should be understood that in practice, multiple set top boxes can be made to share access to the communications link 104 by cable splitting (i.e., physically and electrically interconnecting them in parallel) or by using other access architectures, which may or may not utilize switching nodes.

In a specific non-limiting example, communication between the CSS 106 and the STB 102 may take place in accordance with EUTELSAT DiSEqC 2.0 Bus Specification v. 4.2, which describes a two way communication protocol between a satellite STB and an outdoor unit (ODU). The DiSEqC 2.0 Bus Specification v. 4.2 is mentioned because it allows extensions that would implement additional functionality required by a specific application. However, it should be appreciated that other versions of the DiSEqC specification, as well as other protocols, including proprietary ones, can be used without departing from the scope of the present invention.

The communications link 104 supports communication over a frequency range that may be L-band (950 MHz to 2150 MHz), without being limited thereto. This frequency range is divided into "user bands". One of these user bands is assigned to the STB 102 (or in the case of a multi-tuner set top box, several user bands may be assigned to the STB 102 but each such user band is uniquely assigned to each tuner). A reverse channel may also exist to permit upstream communication (i.e., from the STB 102 to the CSS 106). In various embodiments, the reverse channel may be a separate frequency channel, a tone that is modulated, etc. A separate cable may also be used for the reverse channel.

The STB 102 includes a memory 103 (e.g., flash memory or any other type of non-volatile storage media) that indicates its assigned user band, thus allowing the STB 102 to utilize the correct central frequency when receiving signals from the CSS 106 along the communications link 104. The memory 103 also stores an identifier of the STB 102 such as an IRD or a serial number (where a multi-tuner STB is concerned, an extension may be provided for uniquely identifying each tuner). Other ways of identifying the STB 102 are of course possible, including various forms of codes and addresses. Other data may also be stored in the memory 103 as will become apparent from the description to follow.

The CSS 106 includes or has access to a memory 107 (e.g., flash memory or any other type of non-volatile storage media) in which it stores the assignment of user bands to set top boxes including the STB 102. For example, the STB 102 may be identified by its IRD, serial number or other identifier mentioned above, while the assigned user band may be identified by its center frequency or by an index or other code. The memory 107 also stores an identifier of the CSS 106, such as a serial number, hardware identifier (HWI), or other form of identifier. Other data may also be stored in the memory 107 as will become apparent from the description to follow. The memory 107 may be part of the CSS 106 or accessible thereto via a data network such as the Internet.

The STB 102 is connected to a display set viewed by a viewer. The display set could be a television set, computer monitor, wireless communication device or a device implementing a combination of the aforementioned functionalities. The STB 102 performs video decoding and other functions, including receiving an indication of the channel that the viewer wants to watch. In particular, over time, the STB 102 generates tuning requests based on channels identified by the viewer. Specifically, a channel identified by the viewer (e.g., via a remote control device or by pressing a button on the display set) is mapped to a desired satellite transponder channel by the STB 102. The desired satellite transponder channel is identified in a tuning request sent to the CSS 106 over the communications link 104 in accordance with a format, which can be the DiSEqC™ format (without being limited thereto). The tuning request can be sent over the reverse channel (e.g., using a separate frequency band reserved for upstream communication, one or more DiSEqC™ tone frequencies, a separate cable, etc.) from the STB 102 to the CSS 106.

Figure 2:
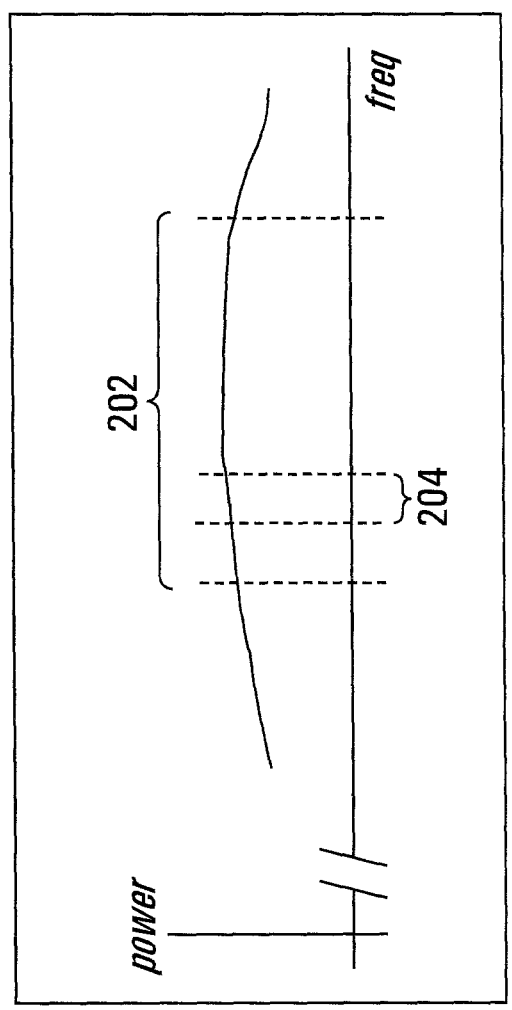
FIG. 2 is a spectral diagram showing a wideband satellite signal containing a desired satellite transponder channel to be isolated by the channel stacking switch on request from the set top box.

The CSS 106 is responsible for receiving tuning requests from the STB 102 (and other set top boxes, if applicable) and processing the requests. Specifically, the CSS 106 determines where in the satellite frequency range the desired satellite transponder channel is located. A mapping (e.g., in the memory 107) could be consulted to this effect in order to identify a target wideband satellite frequency range. Then, the CSS 106 provides a satellite feed unit 108 (e.g., a low noise block downconverter 110 connected to a satellite dish 112) with a control signal. With additional reference to FIG. 2, the control signal allows the satellite feed unit 108 to admit a wideband satellite signal 202 to the CSS 106, such signal occupying the target wideband satellite frequency range. Examples of parameters that can be controlled by the CSS 106 include the polarization and frequency range of the admitted wideband satellite signal 202. Further information regarding an example manner of controlling a low noise block downconverter can be found in the document entitled "Low Noise Block Downconverter" from Satellite Signals Limited, available at www.satsig.net/lnb/explanation-description-lnb.htm. This document is hereby incorporated by reference herein.

Next, the CSS 106 isolates the desired satellite transponder channel 204 within the wideband satellite signal 202. This can be done by translating in the frequency domain the desired satellite transponder channel 204 to the user band (i.e., the tuner central frequency) assigned to the STB 102 that originated the tuning request. A surface acoustic wave (SAW) filter can be used for this purpose. The resulting signal, denoted 206, is sent to the STB 102. The signal 206 can be "stacked" (i.e., frequency multiplexed) with other signals in other user bands destined for other set top boxes. These are all sent together and each individual STB will know which signal to consider, based on its own user band, which is uniquely assigned.

Thus, it will be appreciated that the tuner in the STB 102 does not need to change its central frequency during normal operation. Rather, it is the CSS 106 that takes over the tuning function, mapping a desired satellite transponder channel to the tuner's central frequency.

In accordance with a specific non-limiting embodiment of the present invention, a securitization protocol is provided for securing communication between the CSS 106 and the STB 102.

Figure 3:
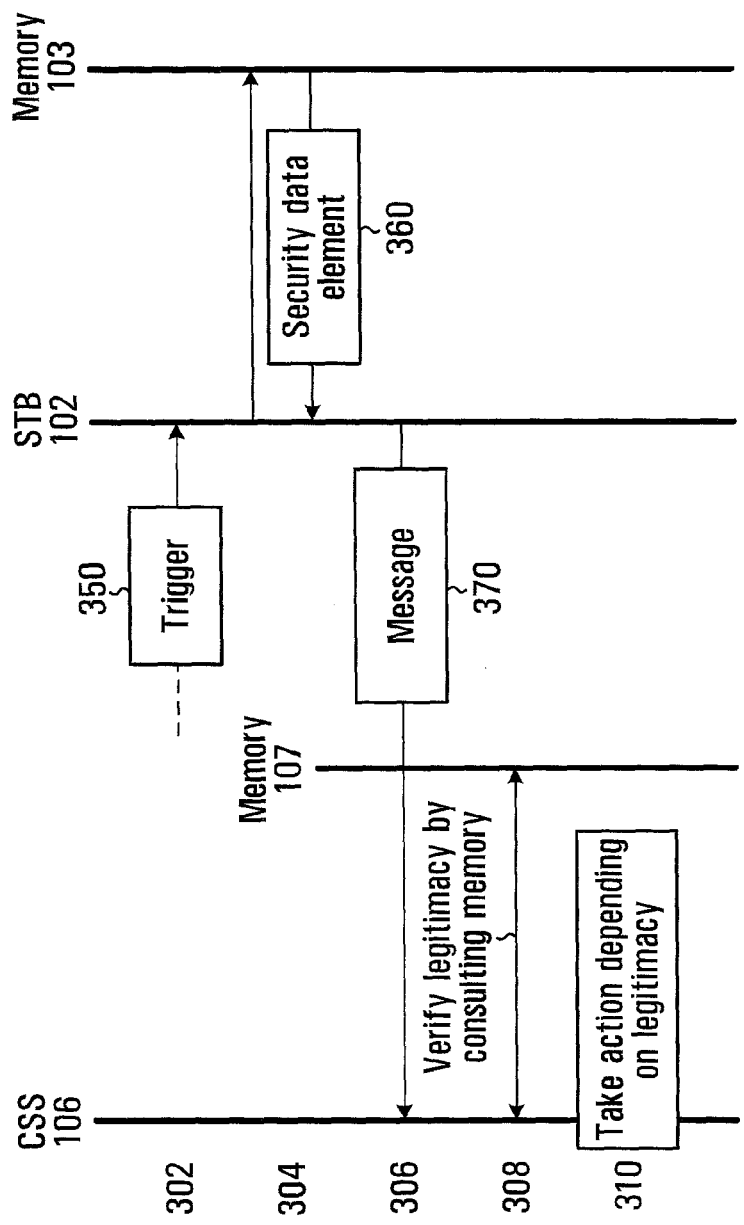
FIG. 3 is a signal flow diagram showing a protocol for securing a channel between the channel stacking switch and the set top box, in accordance with a specific non-limiting embodiment of the present invention.

With reference to FIG. 3, at step 302, the STB 102 receives a trigger 350. In one embodiment, the trigger 350 can be sent when the head end 102 wishes to secure communications between the CSS 106 and the STB 102. In this case, the STB 102 receives the trigger 350 via the satellite dish 112, the low noise block downconverter 110, the CSS 106 and the communications link 104. In another embodiment, the trigger 350 can be sent under control of the CSS 106. The trigger 350 can be issued by the appropriate entity a single time, periodically, after every cold boot, or generally at any arbitrary time instant or instants. In another embodiment, which may be less secure, the trigger 350 can be generated by the STB 102 itself, either autonomously or based on input received from the viewer.

At step 304, in response to having received the trigger 350 at step 302, the STB 102 obtains a security data element 360. The security data element 360 may take on various forms and may be obtained in various ways, several of which are described later on in greater detail.

At step 306, the STB 102 combines the security data element 360 with data destined for the CSS 106 (such as a tuning request) to formulate a message 370. Combining can include appending the security data element 360 to the data, encrypting the data with the security data element 360, etc., as will be described herein below in greater detail. Message 370 is sent to the CSS 106 over the reverse channel (e.g., using a separate frequency band reserved for upstream communication, one or more DiSEqC™ tone frequencies, a separate cable, etc.).

From the perspective of the CSS 106, it cannot know a priori whether or not any given received message from any given set top box (such as message 370 from the STB 102) is indeed legitimate. Therefore, at step 308, upon receipt of message 370 from the STB 102, the CSS 106 verifies its legitimacy in one of several possible ways, each of which involves consulting the memory 107, and some of which are described below in greater detail. A received message that will have been formulated based on combining data destined for the CSS 106 with the security data element 360 will be considered "legitimate" by the CSS 106, as will be described later on.

At step 310, the CSS 106 takes an action depending on whether or not the received message (in this case message 370) was determined to be legitimate at step 308.

For example, if the received message (in this case message 370) was found to be legitimate at step 308 and included a tuning request (which may specify a desired satellite transponder channel), the action taken at step 310 can comprise serving the tuning request on behalf of the STB 102. This can include controlling the low noise block downconverter 110 so as to admit a wideband satellite signal from an ambient signal received at the satellite dish 112, isolating the desired satellite transponder channel from the wideband satellite signal and frequency translating the desired satellite transponder channel into the user band assigned to the STB 102.

On the other hand, if the received message (in this case message 370) was found not to be legitimate at step 308, then the action taken at step 310 can comprise returning an error message to the STB 102 in its assigned user band, in response to which the STB 102 can display (or otherwise convey) an error message perceptible by the viewer.

As mentioned above, the security data element 360 may take on various forms in different embodiments, with corresponding differences in the manner in which it is combined with data to formulate messages (such as message 370) sent to the CSS 106 and also differences in the manner in which the CSS 106 verifies a received message's legitimacy. The following non-limiting example scenarios offer different levels of security with different levels of implementational complexity. It should also be appreciated that other security scenarios are possible.

Figure 4:
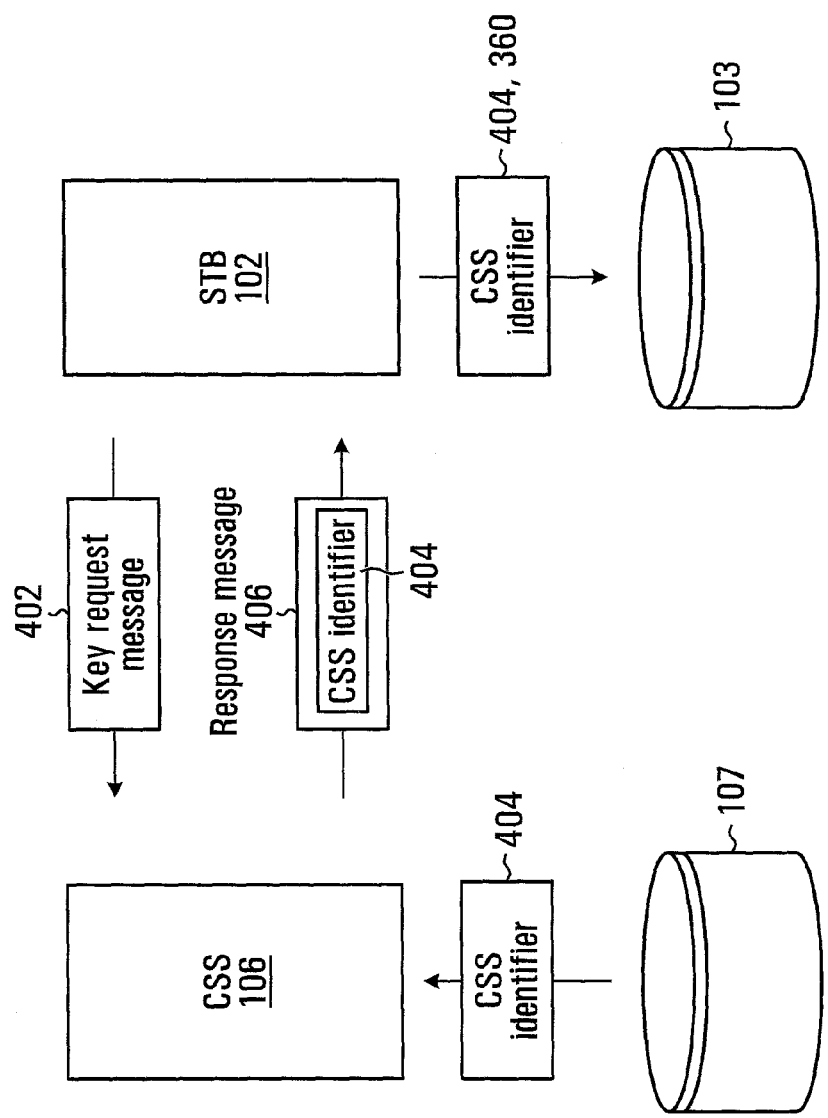
FIGS. 4-6 are flow diagrams showing three non-limiting alternative approaches by virtue of which the set top box obtains a security data element for transmission to the channel stacking switch as part of the protocol of FIG. 3.

In a first example security scenario, the security data element 360 is a key obtained from the CSS 106. The key may take the form of an identifier of the CSS 106 or other data known to the CSS 106. Specifically, with reference to FIG. 4, the STB 102 issues a key request message 402 to the CSS 106. The CSS 106 accesses the memory 107 and extracts an identifier 404 of the CSS 106 (e.g., the HWI). The CSS 106 then issues a response message 406 to the STB 102 containing the identifier 404. At the STB 102, the identifier 404 received from the CSS 106 is stored in the memory 103 as the security data element 360.

Thus, combining the security data element 360 with data (e.g., a tuning request) destined for the CSS 106 in order to formulate message 370 (as mentioned at step 306) comprises the STB 102 encrypting such data with the identifier 404 using any desired technique for symmetric encryption, i.e., in such a way that the same identifier 404 can be used by the CSS 106 to successfully decrypt messages that have been encrypted.

Accordingly, at step 308, the "processing" carried out by the CSS 106 on message 370 is an attempt to decrypt message 370 using the identifier 404 that had previously been sent to the STB 102 which, if successful, will yield the data destined for the CSS 106 (e.g., a tuning request).

Figure 5:
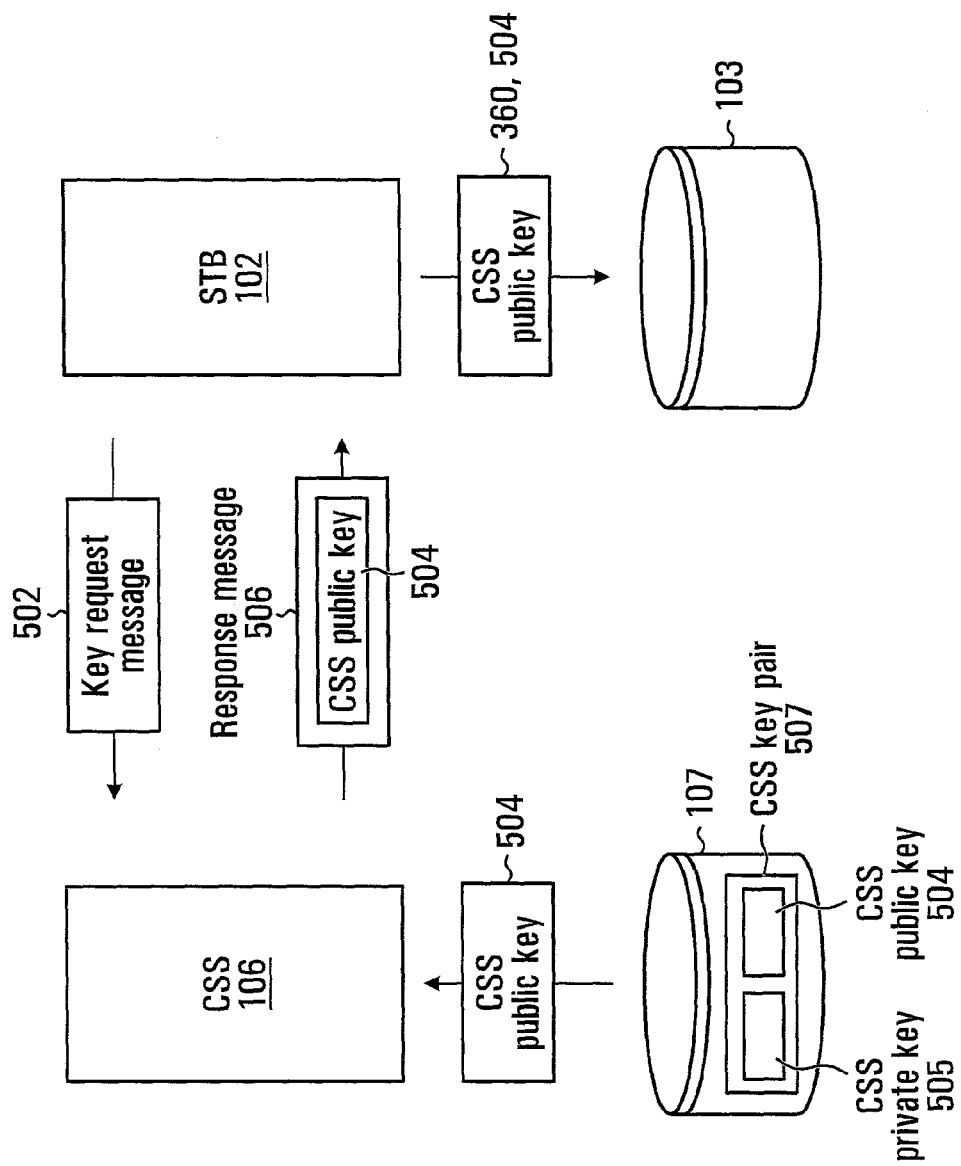

In a second example security scenario, the security data element 360 is also a key obtained from the CSS 106, except that the key is an encryption key used in asymmetric encryption. The encryption key may take the form of a public key forming part of a public-private key pair, with the corresponding private key being held secret in the memory 107 of the CSS 106. With reference to FIG. 5, the STB 102 issues a key request message 502 to the CSS 106. The CSS 106 accesses the memory 107 and extracts a CSS public key 504. The memory 107 also stores a complementary CSS private key 505 in association with the CSS public key 504 as part of a CSS key pair 507. The CSS 106 then issues a response message 506 to the STB 102 containing the CSS public key 504. At the STB 102, the CSS public key 504 received from the CSS 106 is stored in the memory 103 as the security data element 360.

Thus, combining the security data element 360 with data destined for the CSS 106 (e.g., a tuning request) in order to formulate message 370 (as mentioned at step 306) comprises the STB 102 encrypting such data with the CSS public key 504 using any desired technique for asymmetric encryption, i.e., in such a way that successful decryption requires a complementary decryption key, in this case the CSS private key 505.

Accordingly, at step 308, the processing carried out by the CSS 106 on message 370 is an attempt to decrypt message 370 using the CSS private key 505 stored in the memory 107 which, if successful, will yield the data destined for the CSS 106 (e.g., a tuning request).

It will be appreciated that in the second example security scenario above, the CSS 106 always retains information that the STB 102 cannot access (in this case, the CSS private key 505), which enhances security relative to the first security scenario. However, there is more processing overhead required of the processors at the CSS 106 and the STB 102.

Several techniques can be applied to the second example security scenario in order to further enhance security. One security enhancement is to change the key pair over time. That is to say, a different CSS public key can be provided to the STB 102 at various times, e.g., periodically or for every $N^{th}$ message, where N can be as low as 1. To this end, the memory 107 at the CSS 106 may include a table containing a plurality of key pairs from which a new pair is selected when needed. It is also possible for the pairs to be indexed and for the CSS public keys in the table also to be indexed and previously stored in the memory 103 at the STB 102. Thus, when a new key pair is selected (either by the CSS 106 or by the STB 102), a new index is selected without revealing the CSS public key.

Another security enhancement is to encrypt the reverse channel. Specifically, the memory 103 at the STB 102 may store a STB public key and a complementary STB private key.

The key request message 502 sent by the STB 102 can include the CSS public key, which is then used by the CSS 106 to encrypt the response message 506 containing the CSS public key 504. The received (encrypted) response message 506 is then decrypted by the STB 102 using the STB private key to reveal the CSS public key 504 contained therein. In this way, only a set top box with access to the STB private key would be able to properly obtain the CSS public key 504, which enhances security.

Figure 6:
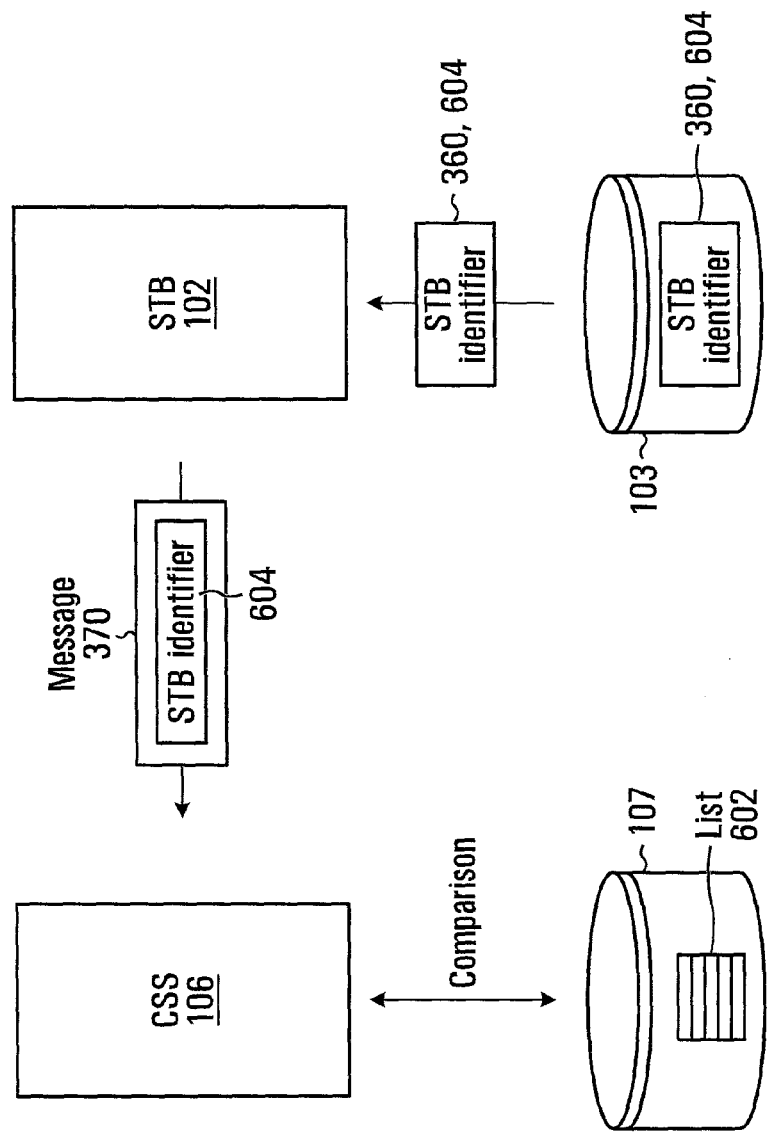

A third example security scenario is a variant that requires very little in the way of computational overhead. Specifically, with reference to FIG. 6, the memory 107 at the CSS 106 stores a list 602 of identifiers of set top boxes that are considered "authorized". In an alternative embodiment, the list 602 contains identifiers of set top boxes that are considered "not authorized". The list 602 of authorized set top boxes (or unauthorized set top boxes) can be updated over time by the head end 120.

Additionally, an identifier of the STB 102, denoted 604, is stored in the memory 103 at the STB 102. In accordance with the third security scenario, the security data element 360 comprises the identifier 604, and data sent to the CSS 106 (e.g., a tuning request) can be combined with the identifier 604 simply by appending the identifier 604 to such data. Thus, message 370 contains both the data destined for the CSS 106 and the identifier 604.

Accordingly, at step 308, the processing carried out by the CSS 106 on message 370 containing the data destined for the CSS 106 includes extraction of the identifier 604 and comparison of the identifier 604 to the identifiers in the list 602. If the identifier 604 appears on the list 602 and the list 602 contains identifiers of set top boxes that are considered authorized, then message 370 is considered legitimate, otherwise the message is considered not legitimate. On the other hand, if the identifier 604 appears on the list 602 and the list 602 contains identifiers of set top boxes that are considered not authorized, then message 370 would be considered not legitimate, otherwise the message would be considered legitimate.

It should be appreciated that in the third example security scenario, the STB 102 does not require knowledge of information about the CSS 106. In contrast, the CSS 106 needs to know which set top boxes are authorized (or not authorized).

In view of the foregoing, it should be appreciated that if a new set top box is connected to the CSS 106 once the above securitization protocol has been executed, functionality of such new set top box will be impaired, because it does not have access to an appropriate security data element (e.g., the identifier 404 of the CSS 106, the CSS public key 504, the identifier of an authorized STB) that would allow it to formulate a legitimate message for the CSS 106. In particular, this prevents pirated set top boxes from successfully communicating with the CSS 106 in order to carry out certain important functions such as channel changes.

It will also be appreciated that even if the STB 102 is capable of formulating messages that are considered by the CSS 106 to be legitimate, it may still be necessary to overcome conventional security barriers that may exist before viewing of a television channel is allowed. Such additional security barriers may include the provision of conventional conditional access codes, smart cards and the like.

In order to be broken by an attacker (i.e., in order to determine a key being used to encrypt data exchanged between the CSS 106 and the STB 102), certain of the above described securitization protocols require the attacker to solve a computational problem of NP complexity, i.e., it is in the class of problems that is the hardest to solve by brute force attacks. Nevertheless, an attacker may attempt to intercept the communication between the CSS 106 and the STB 102 using a "man in the middle" type of attack. There are known ways to avoid such "man in the middle" attacks in a theoretical sense, such as generating and rotating session keys, over-encryption (e.g., Diffie-Hellman encryption), certificates and so on. However, these methodologies, while indeed usable, are not necessarily optimized for the satellite TV environment, where the CSS 106 and the STB 102 are essentially consumer electronics devices, having little computational power to efficiently implement such schemas.

In accordance with a specific non-limiting embodiment of the present invention, electronic counter measures (ECMs) can be used to re-secure the channel between the CSS 106 and the STB 102, such as pursuant to an actual or suspected security breach. In this embodiment, an ECM can be a vector/piece of data (e.g., a 32-bit integer) generated and maintained by the head end 120 and that can be targeted to a particular CSS by addressing the ECM to a particular STB connected to the particular CSS. The ECM is sent by the head end 120 over the satellite link.

The CSS 106 will use a hash between its identifier (e.g., a HWI stored in the memory 107) and the ECM as a seed to generate a new CSS public key corresponding to the CSS private key. The net effect is that the STB 102 will see a new/updated CSS public key; therefore the communication channel between the CSS 106 and the STB 102 will be re-secured and the "man in the middle" attack will now fail.

Figure 7:
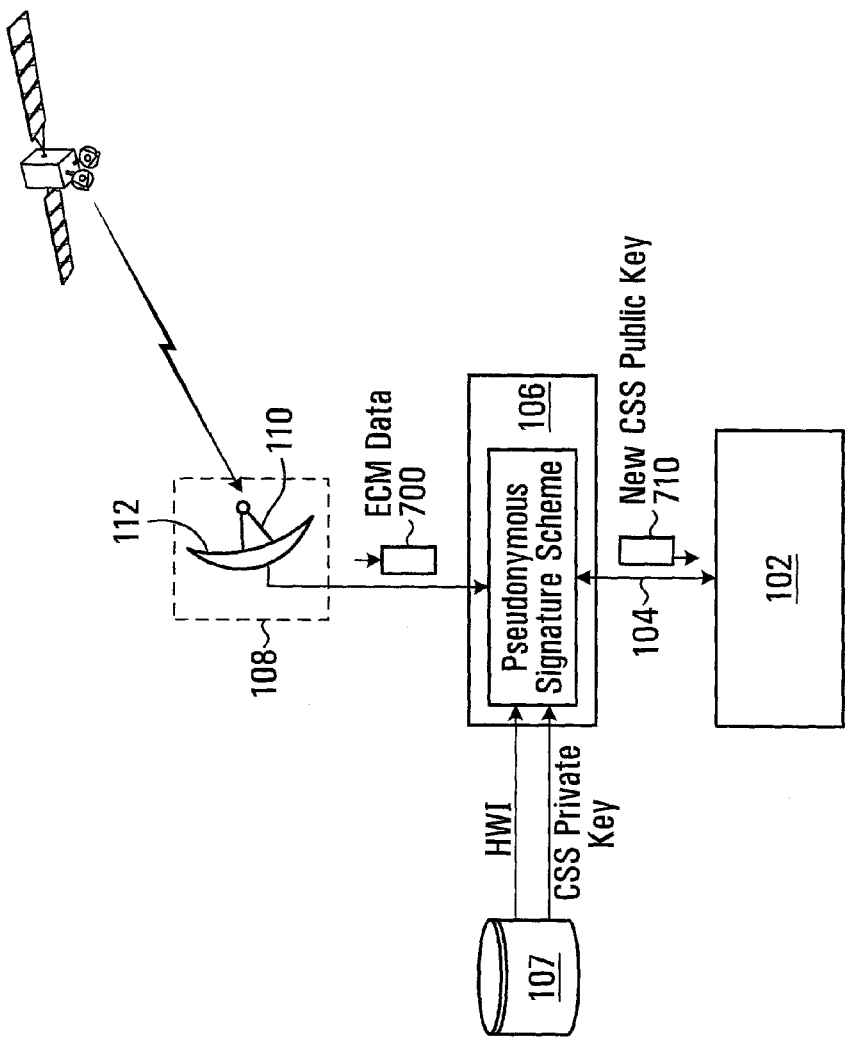
FIG. 7 is a block diagram illustrating a process for re-securing the channel between the channel stacking switch and the set top box on command from the head end, such as pursuant to a security breach.

The process is now described with reference to the block diagram of FIG. 7. As illustrated, the CSS 106 implements (e.g., in software or hardware) a pseudonymous signature scheme. Such a scheme can be described as a) being able to generate multiple public keys for the same private key and b) without knowing the private key, it is cryptographically hard to infer whether two different public keys are associated with the same private key. In practice, a pseudonymous signature scheme can be built using a variant of a bilinear pairing based signature scheme known to those of skill in the art. It is computationally easy/inexpensive to generate a new public key in this fashion. For example, for a regular off-the-shelf microcontroller, generating a new public key might take 2 seconds or less. Given that a new public key is generated only in the rare case when the channel has been (or is suspected of having been) compromised, this is not expected to significantly degrade the viewing experience.

With continued reference to FIG. 7, the process to re-secure the link using a pseudonymous signature scheme is outlined below:

An operator (human or machine) at the head end 120 identifies or suspects a security breach in the communication channel between the STB 102 and the CSS 106.

A new ECM is retrieved from a database at the head end 120. Such ECMs can be pre-generated, although they may be generated on the fly.

A message 700 containing the ECM is built, addressing the IRD number of the STB. (To keep backwards compatibility with conditional access system rules, the Smart Card (SC) can be addressed. As long as SCs and IRD numbers are in a unique one-to-one matching, this is not a constraint.) In a specific non-limiting embodiment, the message 700 can have a payload that includes a new 32-bit integer (i.e., the ECM).

The STB 102 receives the message 700, opens and retrieves the ECM. The ECM can be sent over the channel 104 to the CSS 106 (e.g., using DiSEqC 2.0 or another suitable protocol). In an alternative embodiment, the ECM be sent to the viewer via telephone or Internet, and the viewer can then enter it into the STB 102.

The CSS 106 uses its HWI, the CSS private key and the received ECM to compute a new CSS public key 710, which is rendered available to the STB 102.

Under control of the head end 120, the STB 102 initializes a new key exchange with the CSS 106. The new CSS public key 710 is from now on used to encrypt the outgoing traffic (i.e., traffic destined for the CSS 106).

Thus, it will be appreciated that embodiments of the present invention assist in combating piracy and improving signal integrity. As a result, revenue loss due to signal theft is reduced and confidence (by the content owners) in the satellite signal integrity is increased, with a potential positive impact on revenues.

Those skilled in the art will appreciate that in some embodiments, the STB 102 and/or the CSS 106 may be implemented using one or more computing apparatuses that have access to a code memory which stores computer-readable program code (instructions) for operation of the one or more computing apparatuses. The computer-readable program code could be stored on a medium which is fixed, tangible and readable directly by the one or more computing apparatuses, (e.g., removable diskette, CD-ROM, ROM, fixed disk, USB drive), or the computer-readable program code could be stored remotely but transmittable to the one or more computing apparatuses via a modem or other interface device (e.g., a communications adapter) connected to a network (including, without limitation, the Internet) over a transmission medium, which may be either a non-wireless medium (e.g., optical or analog communications lines) or a wireless medium (e.g., microwave, infrared or other transmission schemes) or a combination thereof. In other embodiments, the the STB 102 and/or the CSS 106 may be implemented using pre-programmed hardware or firmware elements (e.g., application specific integrated circuits (ASICs), electrically erasable programmable read-only memories (EEPROMs), flash memory, etc.), or other related components.

Certain adaptations and modifications of the described embodiments can be made. Therefore, the above discussed embodiments are to be considered illustrative and not restrictive. Also it should be appreciated that additional elements that may be needed for operation of certain embodiments of the present invention have not been described or illustrated as they are assumed to be within the purview of the person of ordinary skill in the art. Moreover, certain embodiments of the present invention may be free of, may lack and/or may function without any element that is not specifically disclosed herein.

What is claimed is:

1. A method for implementation by a channel stacking switch, comprising:
    maintaining a private key and a public key;
    obtaining electronic counter measure (ECM) data sent by a set top box in communication with the channel stacking switch;
    obtaining an identifier of the channel stacking switch;
    formulating a new public key based on the private key, the identifier and the ECM data;
    rendering the new public key available to the set top box.

2. The method defined in claim 1, further comprising managing a memory in which the private key, the public key and the new public key are stored.

3. The method defined in claim 2, further comprising replacing the public key with the new public key in the memory.

4. The method defined in claim 1, further comprising carrying out a pseudonymous signature scheme to formulate the new public key.

5. The method defined in claim 1, further comprising, prior to obtaining the ECM data, receiving a message from a head end and forwarding the message to the set top box, the message comprising the ECM data.

6. The method defined in claim 1, wherein the identifier of the channel stacking switch comprises a hardware identifier.

7. The method defined in claim 1, further comprising decrypting data received from the set top box using the private key.

8. The method defined in claim 7, wherein prior to obtaining the ECM data, at least some of the data received from the set top box is encrypted using the public key and after rendering the new public key available to the set top box, at least some of the data received from the set top box is encrypted using the new public key.

9. A channel stacking switch, comprising:
- a memory configured to maintain a private key and a public key;
- a communications interface configured to communicate with a set top box over a communication channel and also configured to receive data sent from a head end over a satellite link;
- a processing entity configured to obtain via the communication interface electronic counter measure (ECM) data sent by the set top box, obtain an identifier of the channel stacking switch; formulate a new public key based on the private key, the identifier and the ECM data and send the new public key to the set top box.

* * * * *